July 1, 1969          S. F. COOPER          3,453,042

DETACHABLE LENS ASSEMBLY FOR SPECTACLE FRAMES

Filed Aug. 9, 1966

INVENTOR.
SHELDON F. COOPER
BY
*Elliott & Pastoriza*
ATTORNEYS

United States Patent Office 3,453,042
Patented July 1, 1969

3,453,042
DETACHABLE LENS ASSEMBLY FOR
SPECTACLE FRAMES
Sheldon F. Cooper, 510 N. Orlando Ave.,
Los Angeles, Calif. 90048
Filed Aug. 9, 1966, Ser. No. 571,266
Int. Cl. G02c 1/02
U.S. Cl. 351—86                                    1 Claim

ABSTRACT OF THE DISCLOSURE

A set of interchangeable lens assemblies is arranged for detachable connection with a spectacle frame that includes a pair of rims. Retaining openings are formed through the inside portions of the rims. The lens assemblies each incorporate a spring coupled to a pair of spring biased nose guards shaped to interconnect with the rim openings in order to detachably couple the spectacle frame and a lens assembly together.

---

This invention relates generally to eyeglasses, spectacles and the like, and more particularly to a detachable lens assembly for a spectacle frame permitting interchangeable use of lenses and frames.

Lens assemblies are available which permit the user to clamp or "clip on" the assembly to the regular spectacles. Examples include sun glasses which are designed for mounting on the spectacle frame for pivoting movement downwardly over the regular lenses when desired. Other assemblies utilize clips or tabs for mounting the lenses in front of the regular lenses of the spectacles. Such arrangements are both cumbersome and unaesthetic in appearance.

Moreover, such arrangements do not adequately provide a convenient solution for a situation in which the wearer may require one type of lenses for reading and another type for viewing objects at greater distances, such as driving for example. In such cases, the person must often carry two or more sets of glasses with the resulting inconvenience and expense.

With the foregoing in mind, it is accordingly a primary object of this invention to provide a detachable lens assembly for spectacle frames permitting the user to quickly and easily secure and detach lenses to the frame as desired, while eliminating the foregoing problems.

Another object is to provide a novel spectacle frame and a detachable lens assembly, which when intercoupled, eliminate the exposed clamps, clips and similar devices of prior arrangements, with the result that the frame and lenses present the appearance of an integral unit.

Another object is to provide a detachable lens assembly which is simple and rugged in construction and may be manufactured economically.

Briefly, these and many other objects and advantages of this invention are attained by providing a unitary lens assembly adapted to be detachably mounted on the rear of a spectacle frame. The spectacle frame includes a bridge portion interconnecting a pair of rim portions defining eye openings. The lens assembly includes a pair of interconnected transparent lenses receivable within the rim portions, and locking means for securing the lens assembly on the frame. The spectacle frame may be constructed with means for receiving portions of the locking means in interfitting relation. The locking means is constructed to enable the lens assembly to be detached from the spectacle frame when desired.

A better understanding of the invention will now be had by referring to a preferred embodiment thereof as illustrated in the accompanying drawings, in which.

Figure 1:
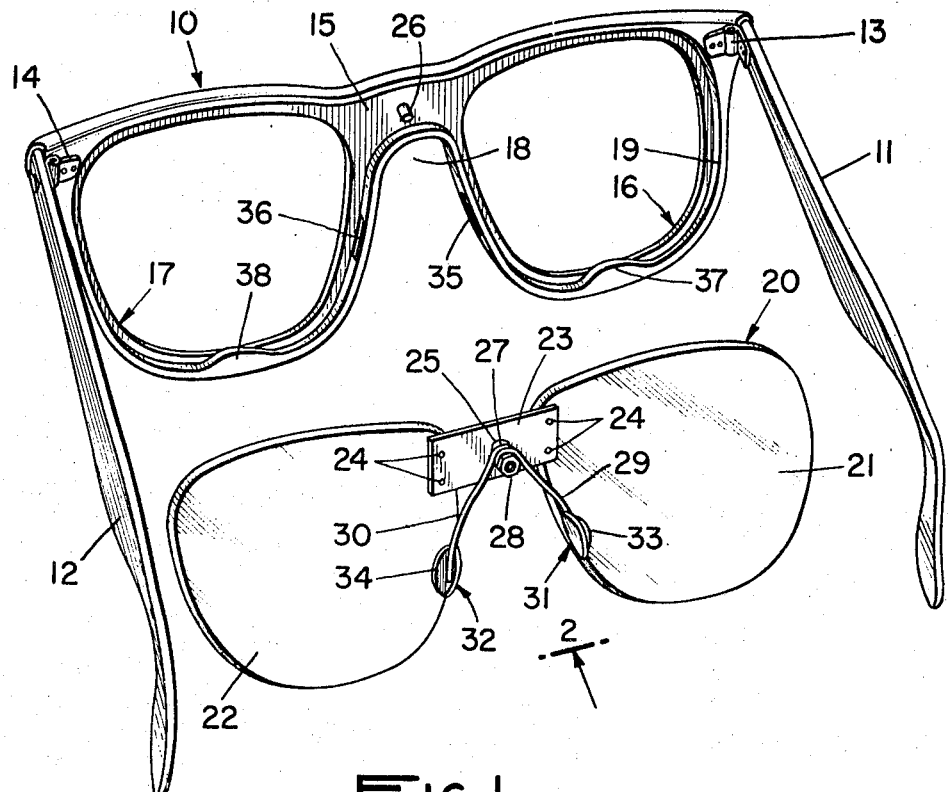
FIGURE 1 is a perspective view of the spectacle frame and detachable lens assembly of the invention.

Referring first to FIGURE 1, there is shown an eyeglass or spectacle frame 10 having temple pieces 11 and 12 secured on its ends by means of hinges 13 and 14, in the usual manner. The frame 10 includes a bridge portion 15 interconnecting a pair of rim portions 16 and 17 being spaced from the bridge portion to define a nose space 18. The frame 10 includes a continuous rib 19 formed on the rear side of the frame and extending around the rim portions and bridge portion to define an area for receiving a lens assembly 20 to be now described.

The lens assembly 20 includes a pair of transparent lenses 21 and 22 interconnected in spaced relation by a mounting plate 23 secured thereto by suitable connecting pins 24. The lenses and mounting plate are arranged such that the lenses will be received within the rim portions 16 and 17, respectively, upon positioning the mounting plate 23 against the bridge portion 15 of the frame 10. It will be understood that the lenses 21 and 22 are shaped to correspond to the rim portions 16 and 17, such that the peripheral edges of the lenses will be bounded by the continuous rib 19.

The mounting plate 23 includes a hollow tube 25 projecting therethrough for receiving a lug 26 formed on the bridge portion 15 of the frame 10. The lug 26 projects rearwardly from the center of the bridge portion 15 and serves to center the plate 23 on the bridge portion such that the lenses 21 and 22 will be properly oriented and positioned within the rim portions 16 and 17, respectively.

The lens assembly 20 includes means for releasably locking or securing the assembly on the frame 10. Toward that end, a spring member 27 is wound around the tube 25 and is held thereon by a nut 28 threadedly received on the tube 25. The spring 27 includes a pair of end portions 29 and 30 extending downwardly from the tube 25 in diverging relation. The end portions 29 and 30 are arranged such that movement toward each other is resisted by the resilient action of the spring 27 as a result of its being coiled around the tube 25.

The locking means of the lens assembly 20 further includes a pair of nose guard members 31 and 32 secured to the end portions 29 and 30, respectively, of the spring 27. The nose guard members 31 and 32 include flange portions 33 and 34, respectively, for interfitting with the frame 10 to secure the lens assembly 20 in position as will be described. Moreover, the nose guard members provide a means for supporting the frame and lens assembly on the nose of the wearer and thus serve a dual purpose.

The flange portions 33 and 34 are adapted to be received within openings 35 and 36 respectively, defined through the continuous rib 19 on the rim portions 16 and 17, as will be described.

Figure 2:
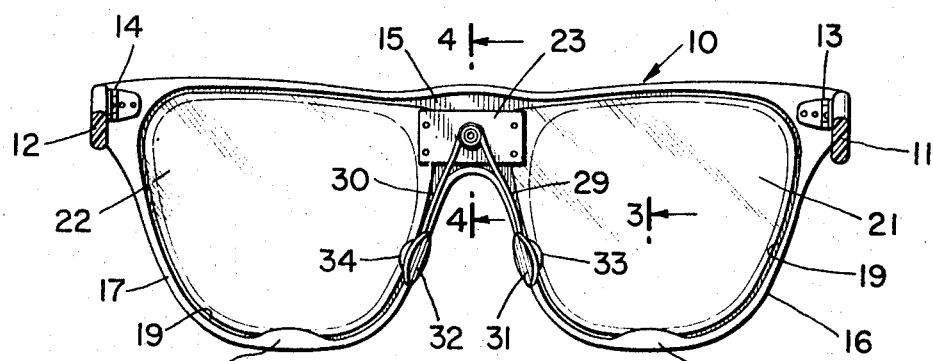
FIGURE 2 is an elevation view taken in the direction of arrow 2 of FIGURE 1 illustrating the lens assembly mounted on the spectacle frame.

In FIGURE 2 the lens assembly is shown mounted on the frame 10 wherein the mounting plate 23 is positioned on the bridge portion 15 and the lenses 21 and 22 received within the rim portions 16 and 17, such that the peripheral edges of the plate and lenses are bounded by the continuous rib 19. In the preferred form of the invention, the lower portion of each of the rim portions 16 and 17 may include lip portions 37 and 38, respectively, projecting upwardly from the continuous rib 19 for insuring proper seating of the lenses within the rim portions.

Figures 3, 4:
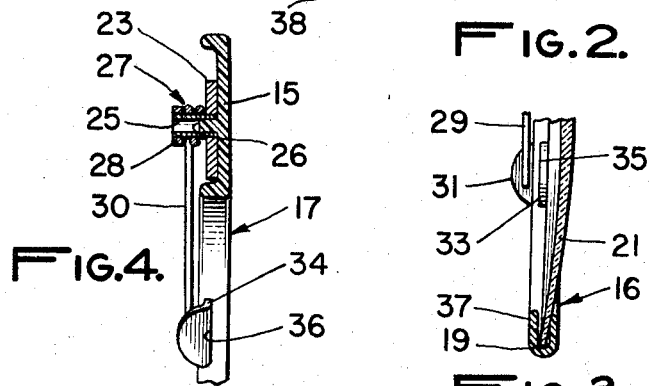
FIGURE 3 is a sectional view taken in the direction of arrows 3—3 of FIGURE 2; and, FIGURE 4 is a sectional view taken in the direction of arrows 4—4 of FIGURE 2.

The lip 37 is shown in cross-section in FIGURE 3 wherein the cooperation of the lip 37 and the lens 21 is readily apparent.

As shown in FIGURE 2, the nose guard members 31 and 32 are biased away from each other into interfitting relation with the rim portions 16 and 17, respectively. The manner in which the members 31 and 32 engage the rim portions to secure the lens assembly on the frame 10 is best shown with reference to FIGURES 3 and 4. As shown in FIGURE 3, the flange 33 of the member 31 projects through the opening 35 defined through the rib 19 of the rim portion 16. In like manner, as shown in FIGURE 4, the flange 34 of the member 32 projects through the opening 36 defined through the rib 19 of the rim portion 17. It will thus be seen that the lens assembly is firmly secured on the frame 10, but in such a manner as to be readily detached therefrom.

It is apparent in FIGURE 2, that the frame and lens assembly are designed for intercoupling in such a manner that the mounting plate 23 and associated locking structure are positioned behind the frame. Accordingly, when viewed from the front, only the frame and lenses are visible thus presenting the neat appearance of an integral unit.

In operation, and with reference first to FIGURE 1, the lens assembly 20 may be conveniently gripped by placing the thumb and forefinger on the nose guard members 31 and 32 and moving the members toward each other against the force of the spring 27. The lens assembly is then positioned on the frame 10, whereupon the gripping force on the members 31 and 32 is gradually released permitting the force of the spring 27 to move the members away from each other to position the flanges 33 and 34 through the openings 35 and 36 respectively. As is apparent in FIGURE 4, the tube 25 receives the lug 26 to center the plate 23 on the bridge portion 15 to accordingly insure that the lenses are properly positioned within the respective rim portions of the frame.

The removal of the lens assembly from the frame simply involves moving the nose guard members 31 and 32 toward each other against the force of the spring 27 to withdraw the flanges 33 and 34 from the openings 35 and 36. The lens assembly is then simply moved rearwardly from the frame 10.

From the foregoing, it is apparent that the invention provides a simplified and effective means by which lens assemblies may be quickly and easily mounted on and detached from a spectacle frame. Moreover, the frame and lens assembly are designed such that the same appear as an integral unit when viewed from the front. Accordingly, the problems associated with cumbersome and unsightly prior devices are eliminated.

What is claimed is:
1. Spectacles comprising:
 (a) a spectacle frame having a pair of rims interconnected by a bridge;
 (b) means on the inside portions of the rims defining a pair of retaining openings;
 (c) a pair of lenses;
 (d) a mounting plate interconnecting the lenses;
 (e) a spring coupled to the mounting plate by a tube, the spring having a pair of downwardly diverging spring end portions;
 (f) a lug fixed to and extending rearwardly from the bridge, the lug and tube being sized to interfit in order to center and properly orient the lenses; and,
 (g) a pair of nose guards coupled to the spring end portions, the nose guards being formed with flanges for resiliently snapping into corresponding rim retaining openings in order to releasably interlock the spectacle frame and lenses.

References Cited
UNITED STATES PATENTS

| | | | |
|---|---|---|---|
| 2,284,630 | 6/1942 | Banks | 351—86 |
| 2,524,140 | 10/1950 | Retz | 351—86 |
| 2,586,546 | 2/1952 | Longenecker | 351—86 |
| 2,738,709 | 3/1956 | Matthews et al. | 351—86 |

FOREIGN PATENTS 682,352  11/1952  Great Britain.

DAVID SCHONBERG, *Primary Examiner.*

J. W. LEONARD, *Assistant Examiner.*

U.S. Cl. X.R.

351—41, 88